UNITED STATES PATENT OFFICE.

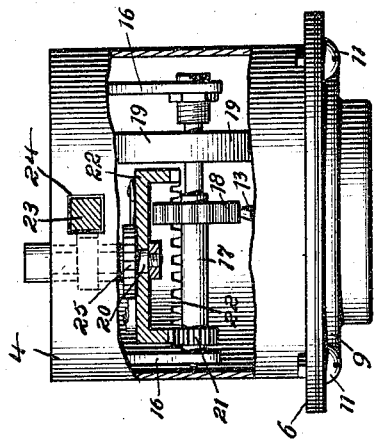

GEORGE F. LONG, OF NEW YORK, N. Y., ASSIGNOR TO GOTTFRIED PIEL, OF NEW YORK, N. Y.

AUTOMOBILE-HORN.

1,300,425.          Specification of Letters Patent.      Patented Apr. 15, 1919.

Application filed July 21, 1916. Serial No. 110,497.

*To all whom it may concern:*

Be it known that I, GEORGE F. LONG, a citizen of the United States, and resident of New York city, in the county of Queens and State of New York, have invented certain new and useful Improvements in Automobile-Horns, of which the following is a specification.

My invention relates in general to a warning signal of a type similar to automobile horns. In this instance the invention relates to such a horn designed for use on bicycles, motor cycles and similar light vehicles and particularly relates to the diaphragm actuating mechanism and containing casing for such horns.

In a device designed for use on these light vehicles it is essential to have the largest possible diaphragm that can be accommodated in a limited space but obviously such a diaphragm necessitates the carrying of mechanisms sufficiently rugged to actuate the same and such mechanism heretofore has necessitated the use of a relatively large casing to inclose the type of mechanism sufficient to vibrate the diaphragm at the high rates usual with automobile horns.

Accordingly, one of the objects of my invention is to provide a diaphragm actuating mechanism capable of vibrating relatively large diaphragms, now in general use in automobile horns, but constructed and assembled compactly as to be accommodated within a casing smaller than the usual automobile horn casing so as to provide a small but powerfully sounding device for use on an attachment to bicycles or similar light vehicles.

Another object of the invention is to provide a device of the class described not only formed of the least possible number of actuating parts, but designed so that these parts may be stamped, pressed or otherwise formed to shape in large numbers with the least possible amount of machining so that in this way a device may be provided which can be marketed at relatively low cost.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a side elevation of a preferred embodiment of my invention, with a portion of the side of the casing removed to show internal mechanism;

Fig. 2 is a view in front elevation of the device shown in Fig. 1 with the diaphragm removed and taken on the line 2—2 of Fig. 1 looking in the direction indicated by the arrows; and Fig. 3 is a plan view looking down upon the top of the device shown in Fig. 1 and with parts broken away and in section to show the diaphragm actuating mechanism.

In the following description and in the claims, parts will be identified by specific names for convenience of expression but they are intended to be as generic in their application to similar parts as the art will permit.

In the drawings, there is shown a containing casing 4, preferably in the form of a light spun metal cup, having a back wall 5 integral therewith and an opened front end, outlined by an outwardly extending diaphragm supporting flange 6. For the purpose of identifying a neat compact and easily handled form of horn, the cylindrical casing is considered as having a depth axially substantially equal to its diameter. The flange 6 forms a rigid brace for one end of a supporting bracket 7, by means of which the device may be securely fixed in position on some suitable part of the vehicle. A vibratory diaphragm 8 is disposed across the open front of the casing and conforms to the flange which forms a seat for the outer edge of the diaphragm. A face plate 9 is stamped to shape and includes a rim 10 for engaging the outer edge of the diaphragm. The diaphragm is securely fastened in position by means of a series of screws 11 passing through the rim 10 and flange 6. The device disclosed omits the usual amplifier and the central portion of the diaphragm is opened to the outside through the forwardly extending pressed flange 12, formed centrally in the face plate 9. The diaphragm is provided with the usual wear-piece 13, which extends inwardly toward the diaphragm actuating mechanism as is usual with devices of this character.

The diaphragm actuating mechanism includes a stamped metal supporting frame 14, demountably affixed to the rear wall 5 by means of externally accessible screws 15. The frame includes a pair of spaced apart forwardly extending arms 16 terminating a short distance in rear of the diaphragm. A driven shaft 17 extends between the arms, adjacent their forward ends, parallels the plane of the diaphragm and has its ends suitably journaled within the arms 16 for free rotary movement. A cam toothed wear-piece engaging member 18 is fixed to the shaft 17 and is disposed in operative engagement with the wear-piece to vibrate the diaphragm. A fly-wheel 19 is fixed to the shaft 17 preferably adjacent one end thereof, so as to provide the maximum possible space for the driving mechanism hereinafter described. The frame 14 also carries a stub shaft 20 extending forwardly from the rear wall substantially at right angles to the axis of rotation to the driven shaft 17. A relatively small spur gear pinion 21 is fixed to the driven shaft 17 preferably as far away from the wear-piece engaging member 18 as possible so as to provide the maximum possible space between this spur gear and the fly wheel. The pinion 21 is constantly in mesh edgewise with the teeth of a crown gear 22, which crown gear is preferably formed initially as a spur gear and then stamped into the cup-shaped form shown. The crown gear is of relatively large diameter so as to provide a multiplying driving connection with the driven shaft. The crown gear is mounted for free rotary movement upon the forward end of the stub shaft about an axis extending at right angles to the axis of the shaft 17. The rear portion of the wear-piece engaging member 18 is positioned within the outlines of the crown gear, which arrangement is permitted by the cup shape of the crown gear. This overlapping of the crown-gear and wear-piece engaging members brings the crown gear close to the driven shaft and permits of the use of relatively large driving members within the relatively narrow depths of the casing.

A well known form of manually actuated thrust member 23 extends through and is guided in an opening 24 in the top of the casing. The thrust member is operatively connected to rotate the gear 22 by a push thereon through a one-way pawl and ratchet connection 25. A spring 26 acts upon the thrust member to restore the same to its normal raised position as is usual with one type of automobile horn now in general use.

In operation, it will be understood that a push upon the thrust member 23 acts through the pawl and ratchet connection to rotate the gear 22 in one direction. The rotation of this gear communicates in motion to the small pinion 21, thereby causing the shaft 17 to rotate at high speed. This motion is continued for a material time due to the effect of the fly wheel as is known with fly wheel devices of this character. The rotation of the shaft 17 causes the wear-piece engaging member to engage the wear-piece and vibrate the diaphragm at a high rate of vibratory movement as is usual with automobile horns.

By means of a device of this character all of the advantages of a heavy open driving mechanism necessary to actuate a large diaphragm is present in this small device. A wear-piece engaging member of relatively large diameter may be used in connection with the high speed driven shaft but the peculiar construction of the cup-shaped spur gear permits the use of such a wear-piece actuating member without increasing the space necessary to accommodate the actuating mechanism in rear of the diaphragm. This crown gear may be made as large as desired, considering the outline of the casing and any available space exteriorly of the large crown gear may be utilized to accommodate the fly wheel.

Placing the wear-piece actuating member between the spur gear and the fly wheel has the incidental advantage in that it distributes the strains on the shaft thus permitting the use of a shaft of relatively small diameter.

The device may be readily and quickly demounted by removing the front plate and diaphragm which provides ready access to the driving mechanism for repairs, oiling or other attention. By loosening the holding screws, the entire driving mechanism may be withdrawn bodily from the casing through its open front end.

It is obvious that one end of the driven shaft 17 may be journaled in an extension from the stud-shaft thus omitting the necessity for one of the arms 16. In this case the driving pinion 21 is mounted on the shaft 17 between the member 18 and the fly-wheel to engage with the opposite side of the crown gear.

While I have shown and described, and have pointed out in the annexed claim, certain novel features of my invention, it will be understood that various omissions, substitutions and changes in the form and details of the device illustrated and in its operation may be made by those skilled in the art without departing from the spirit of the invention.

Having thus described my invention, I claim:

In an automobile horn of the diaphragm type, the combination with a mechanism inclosing casing, including a vibratory diaphragm provided with a wear-piece, of a driving mechanism for actuating said diaphragm, said mechanism including a driven shaft mounted for rotary movement about an axis substantially parallel to the diaphragm and relatively close thereto, a wear-piece engaging member fixed to the shaft to rotate therewith and designed to engage the wear-piece to vibrate the diaphragm, a relatively small spur gear fixed to the shaft and spaced from said member, a crown gear mounted for rotary movement about an axis extending at right angles to the shaft and offset from the axis of the wear-piece, said spur gear meshing with said pinion, said member extending into said crown gear beyond the plane of the teeth thereof, one-way driving means mounted in rear of said crown gear for rotating the same in one direction and a fly-wheel of relatively large diameter fixed to said shaft, offset from the crown gear on the side thereof opposite said member and lapping both the wear-piece, the crown gear and said one-way driving means.

Signed at New York city in the county of New York and State of New York this twenty-ninth day of June, A. D. 1916.

GEORGE F. LONG.

Copies of this patent may be obtained for five cents each, by addressing the "Commissioner of Patents. Washington, D. C."